United States Patent [19]

Takeishi

[11] Patent Number: 5,691,614

[45] Date of Patent: Nov. 25, 1997

[54] SERVO SYSTEM ADJUSTING METHOD AND SERVO CONTROL SYSTEM

[75] Inventor: Hiroaki Takeishi, Utsunomiya, Japan

[73] Assignee: Canon Kabushiki Kaisha, Tokyo, Japan

[21] Appl. No.: 423,698

[22] Filed: Apr. 18, 1995

[30] Foreign Application Priority Data

Apr. 18, 1994 [JP] Japan .................................. 6-078507
Apr. 11, 1995 [JP] Japan .................................. 7-085425

[51] Int. Cl.⁶ .................................................. G05B 13/00
[52] U.S. Cl. .......................... 318/561; 318/610; 318/617; 364/157; 364/474.15
[58] Field of Search .................. 318/561, 568.18, 318/568.22, 616, 617, 609, 610; 364/157, 474.15, 474.3, 148–151, 161, 162

[56] References Cited

U.S. PATENT DOCUMENTS

| | | | |
|---|---|---|---|
| 4,912,386 | 3/1990 | Lurie | 318/561 X |
| 4,950,967 | 8/1990 | Sakamoto et al. | 318/561 X |
| 4,956,593 | 9/1990 | Sakamoto et al. | 318/561 |
| 4,965,501 | 10/1990 | Hashimoto | 318/561 X |
| 5,157,597 | 10/1992 | Iwashita | 318/561 X |
| 5,245,528 | 9/1993 | Saito et al. | 318/561 X |
| 5,394,322 | 2/1995 | Hansen | 364/148 |

*Primary Examiner*—Brian Sircus
*Attorney, Agent, or Firm*—Fitzpatrick, Cella, Harper & Scinto

[57] ABSTRACT

A servo system adjusting method for an integration-proportional differentiation type compensation system for generating a control input by summing an integration of a control error, a controlled amount which is an output of an object to be controlled and a differentiation thereof, multiplied by predetermined coefficients, respectively, for the object to be controlled having a double integration type characteristic in a low frequency band, comprises a step of changing any of a feedback gain $F_1$ of differentiation of the controlled amount, a feedback gain $F_2$ of the controlled amount and a gain H of integration of the control error, and a step of determining other gains based on the changed gain value and the formulas;

$$F_1/F_2 = a * H/F_2$$

$$F_1 = b * (F_1/F_2)/K$$

where $2 \leq a \leq 3$, $1.5 \leq b$

K is a gain of the object to be controlled.

4 Claims, 4 Drawing Sheets

SERVO SYSTEM ADJUSTING METHOD AND SERVO CONTROL SYSTEM

BACKGROUND OF THE INVENTION

1. Field of the Invention

The present invention relates to a servo system adjusting method and a servo control system for matching an object to be controlled to a desired target value.

2. Related Background Art

FIG. 1 shows a configuration of a conventional servo system, particularly a positioning system using a servo motor.

A speed reduction mechanism and a feed screw are combined with the servo motor to which a mechanical load is connected. It is common that a so-called current loop for feeding back an amount of current flowing through the motor is provided in a power amplifier for driving the motor. If a band of the current loop is sufficiently wide, a transfer function of an object to be controlled including the mechanical load and the motor can be fully approximated by double integration.

For the object to be controlled represented in such a manner, it is general that a velocity control loop and a position control loop are sequentially constructed, and a proportional integration type pre-compensator is provided in the velocity control loop and a proportional type pre-compensator is provided in the position feedback loop to form a so-called proportional-proportional integration type compensation system. A control system therefor is shown by a block diagram in FIG. 1.

In FIG. 1, $\omega_o$ represents a position loop gain, $\omega_c$ represents a velocity loop gain and $\omega_a$ represents a gain of an integration compensator in the velocity loop. $\gamma$ represents a target value, and $\omega$ and $\theta$ represent velocity and position, respectively.

It is a conventional method to define a characteristic of the control system by adjusting the respective gains. Namely, the gain $\omega_c$ is set as large as possible so long as the system can be stably operate, the gain $\omega_a$ is set to approximately one third of the gain $\omega_c$ and the gain $\omega_o$ is set to less than one half of the gain $\omega_c$ to attain a desired characteristic.

In such an adjustment of servo system, the velocity loop gain has an important significance.

In the above proportional-proportional integration type compensation system, the servo system is rendered to rapidly match to a desired target value by applying a large operation amount (control input) by the effect of the proportional integration type compensator provided in the velocity control loop. In other words, a slow mode of the object to be controlled is canceled at a zero point in the proportional integration type compensator to set an uncontrollable mode. In this case, however, since the slow mode cannot be canceled for a torque disturbance and the like, a disturbance suppression ability is not enhanced even by increasing the speed of target response. This is discussed in the article "Base of Brushless Motor and its Applications" by Dote et al, Sogo Denshi Publishing Co.

To solve the above problem, an integration-proportional differentiation type compensator may be provided. A controlled amount which is an output of an object to be controlled, its differentiation and an integration of a control error between a target and the controlled amount, multiplied by a predetermined coefficient, respectively, are summed and the sum is applied to the object to be controlled as an operation amount. Unlike the proportional-proportional integration compensation system described above, the latter system intends to improve the characteristic of the object to be controlled. In this case, it is known that the disturbance suppression ability is simultaneously enhanced by increasing the speed of the target response.

However, in the integration-proportional differentiation type compensation system, the setting of the coefficient of the compensator effected in the proportional-proportional integration type cannot be attained. Namely, the effects on the object to be controlled by the respective coefficient are not independent so that it is not possible to substantially set one coefficient and then sequentially determined the other coefficients as it is done in the proportional-proportional integration type. As a result, it is difficult to adjust the servo system. Thus, the integration-proportional differentiation type compensation system has not been widely used in spite of its excellent characteristic and the conventional proportional-proportional integration type compensation system has been adopted at a sacrifice of the disturbance suppression ability.

SUMMARY OF THE INVENTION

It is an object of the present invention to provide a servo system adjusting method and a servo control system which facilitate the adjustment of the servo system which uses the integration-proportional differentiation type compensation system, which are easy to construct and which can enhance the speed of the servo system response, the precision of the servo system and the strength against the disturbance.

In order to achieve the above object, in accordance with one aspect of the present invention, there is provided a servo control system and corresponding servo system adjusting method for an integration-proportional differentiation type compensation system for generating a control input by summing an integrated value of a control error, a controlled amount which is an output of an object to be controlled and the differential value, multiplied by predetermined coefficients, respectively, for the object to be controlled having a substantially double integration type characteristic in a low frequency band, in which one of the feedback gains coefficients $F_1$, $F_2$ and $H$ is selected and set, and using the selected gain coefficient, determining the other two gain coefficients from the formulas (1) and (2):

$$F_2/F_1 = a^* H/F_2 \tag{1}$$

$$F_1 = b^*(F_2/F_1)/K \tag{2}$$

where $2 \leq a \leq 3$, $1.5 \leq b$, and $K$ is a gain of the object to be controlled.

The servo system adjusting method and the servo control system of the present invention will be explained in more detail by the following preferred embodiments.

DETAILED DESCRIPTION OF THE PREFERRED EMBODIMENTS

Figure 1:
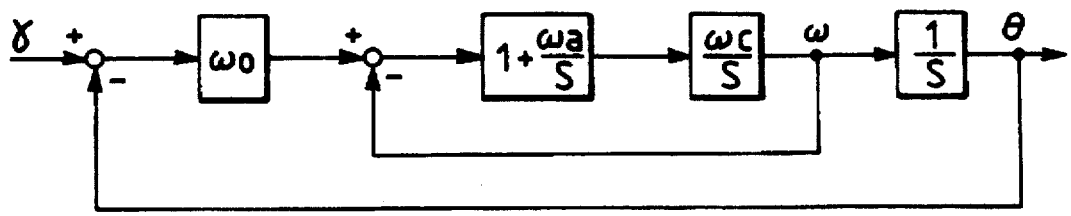
FIG. 1 shows a block diagram of a configuration of a conventional art proportional-proportional integration type.
Figure 2:
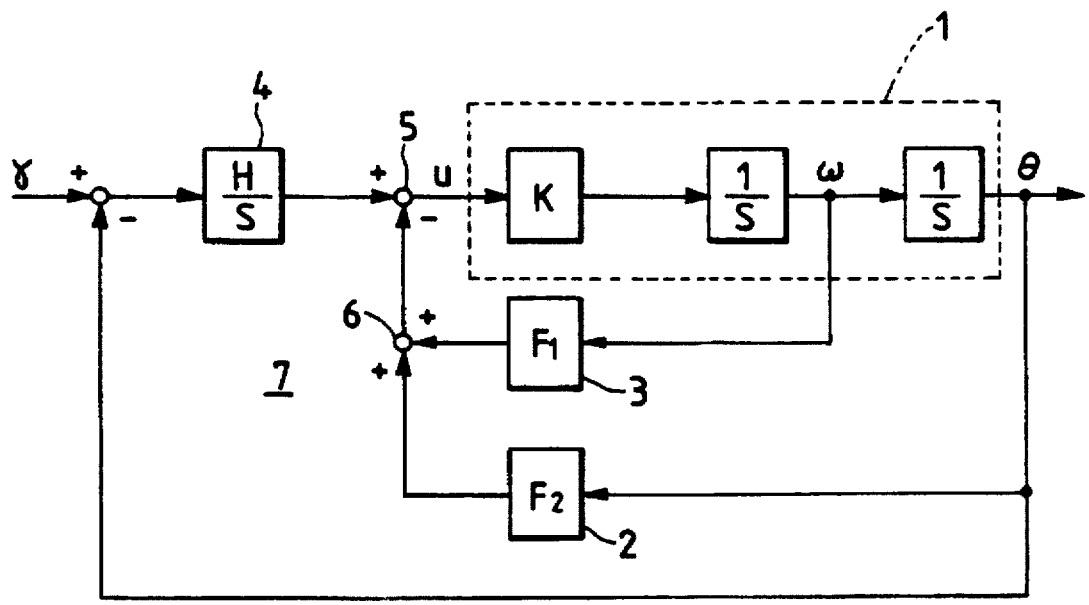
FIG. 2 shows a block diagram of a configuration of a first embodiment of a servo control system of the present invention.

FIG. 2 shows a block diagram of a configuration of a first embodiment of the servo control system of the present invention, which is particularly a position control system using a servo motor as it is in FIG. 1. Numeral 1 denotes an object to be controlled which has a double integration type characteristic (transfer function) in a low frequency band, numeral 2 denotes a coefficient unit having a feedback gain $F_2$ of a position of a controlled amount, numeral 3 denotes a coefficient unit having a feedback gain $F_1$ of a velocity which is a differentiation of the position, and numeral 4 denotes an integrator having a gain H. The coefficient units 2 and 3, the integrator 4 and adders 5 and 6 form an integration-proportional differentiation type compensator 7.

$\theta$ and $\omega$ represent position and velocity, respectively, $\gamma$ represents a target value and u represents a control input.

The integration-proportional differentiation type compensator 7 generates a control input by summing an integration of a control error, a controlled amount which is an output of the object 1 to be controlled and its differentiation, multiplied by predetermined factors, respectively, for the object 1 to be controlled represented by a double integration type transfer function. The gains (feedback gains) meet the following formulas.

$$F_2/F_1 = 2*H/F_2 = \alpha \quad (3)$$

$$F_1 = 2*\alpha/K \quad (4)$$

Namely, the coefficients of the compensator 7 are determined by using a as a parameter and a ratio ($F_2/F_1$) of the gain $F_2$ of the controlled amount to the gain $F_1$ of the differentiation of the controlled amount is set to be double of a ratio ($H/F_2$) of a gain H of the integration of the control error to the gain $F_2$ of the controlled amount, and the gain $F_1$ of the differentiation of the controlled amount is set to a quotient of double of a ratio ($\alpha$) of the gain $F_2$ of the controlled amount to the gain $F_1$ of the differentiation of the controlled amount, divided by a gain K of the object to be controlled.

When the gains are set as described above, the following quadratic form performace index J is minimized.

$$J = \int_0^{-\infty} \left[ \theta^2 + \frac{K^2}{\alpha^6} \left( \frac{du}{dt} \right)^2 \right] dt \quad (5)$$

, wherein $\theta$, K, u are respectively the position of the object to be controlled, the gain of the object to be controlled, and the control input, $\alpha$ is defined by eq. (3), and du/dt is the differentiation of u with respect to time t.

Accordingly, in accordance with the present invention, the steady state can be reached while the energy consumption of the system is being decreased.

When the gains are set in this manner, a characteristic polynomial of a minor formed by the position and velocity feedback loops is represented by $$s^2 + 2\alpha s + 2\alpha^2 = s^2 + 2\zeta\omega_n s + \omega_n^2 \quad (6)$$

where s is a Laplace operator, $$(\omega_n = \sqrt{2}\,\alpha, \zeta = 1/\sqrt{2})$$

Namely, $\alpha$ is proportional to the band of the minor loop. The adjustment of $\alpha$ is equivalent to the adjustment of the velocity loop gain in the prior art and the coefficients of the integration-proportional differentiation type compensator 7 can be adjusted in the same sense as that of adjusting method of the servo system widely used in the conventional art. Further, since all coefficients of the compensator 7 can be uniquely determined by simple arithmetic operations by one parameter equivalent to the velocity loop gain, the system may be readily implemented by using a CPU or the like and a troublesome adjustment of the servo system is not necessary.

In actual, when any of the feedback gain $F_1$ of the differentiation of the controlled amount, the feedback gain $F_2$ of the controlled amount and the gain H of the integration of the control error is to be changed and the changed value is inputted to the CPU, the CPU uniquely determines other gains by the formulas (3) and (4). The determined gains $F_1$, $F_2$ and H are set for the servo system. The output of the object to be controlled is detected, and if the detection result is not proper, any of the gains is again changed and the gains uniquely determined in accordance therewith are again set to the servo system, and the adjustment of the gains is repeated until the servo system becomes satisfactory, namely stabilized.

The value inputted to the CPU may not be an actual gain but it may be a corresponding one to the actual gain. For example, as described above, the inputting of $\alpha$ of the formula (3) is equivalent to the inputting of $F_1$ because $F_1$ is uniquely determined. (K is previously determined.)

Figure 3:
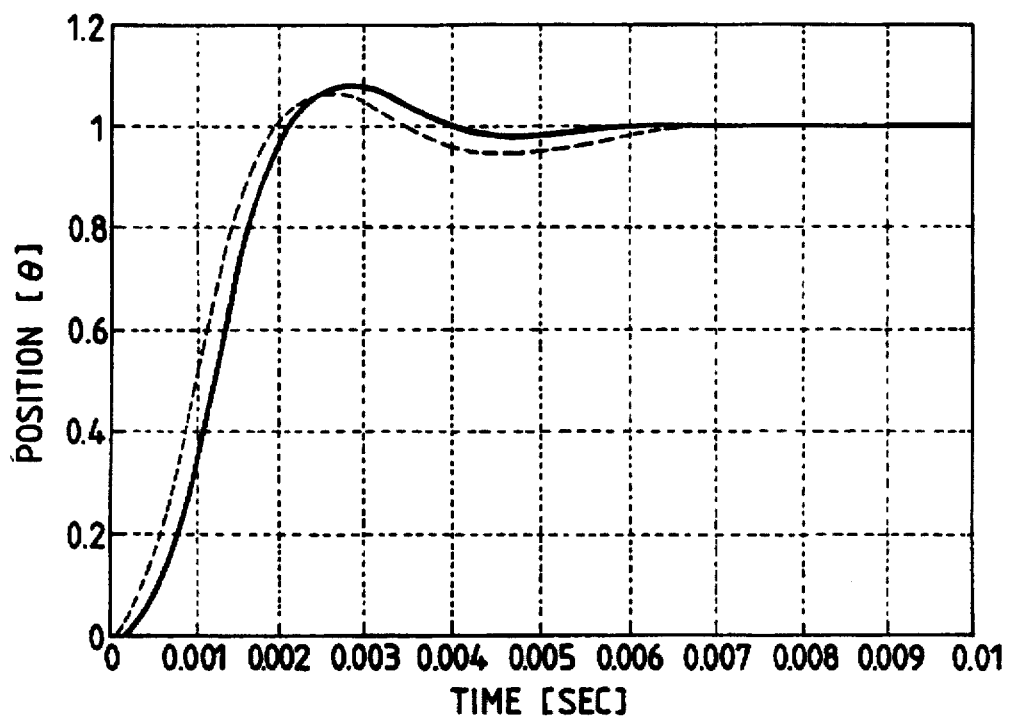
FIG. 3 shows a waveforms of positioning response in the first embodiment of the present invention.
Figure 4:
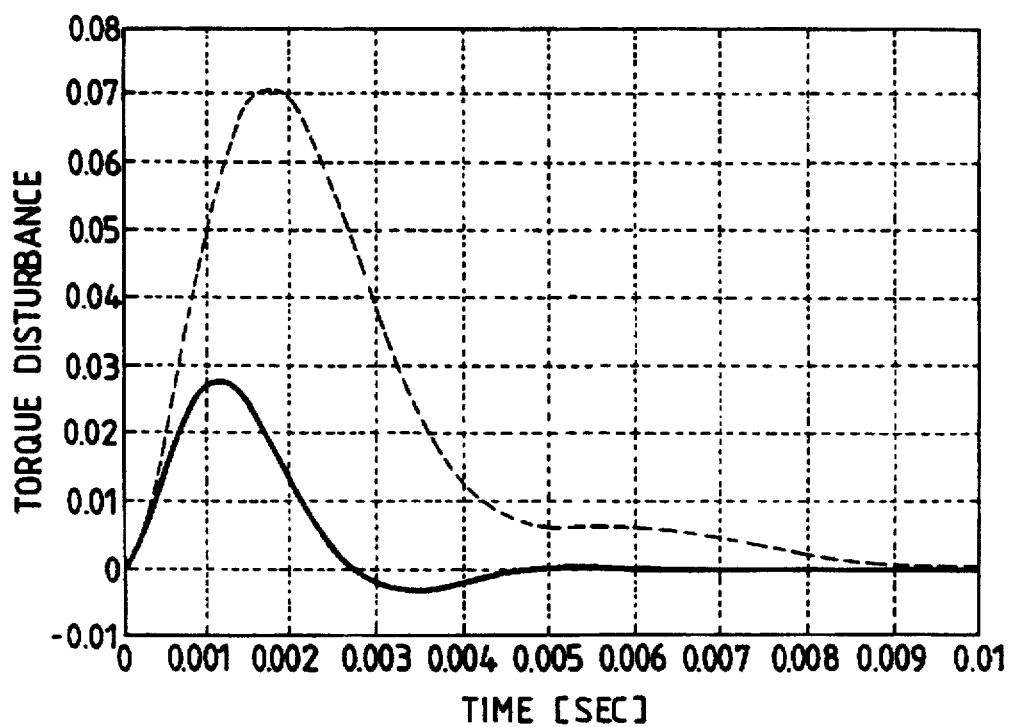
FIG. 4 shows waveforms of response indicating a torque disturbance suppression ability in the first embodiment of the present invention.

FIG. 3 shows waveforms of the positioning response in the present embodiment. An abscissa represents a time (in second) and an ordinate represents a position. FIG. 4 shows waveforms of response to a stepwise torque disturbance. It is assumed that the object 1 to be controlled is an electromagnetic motor having a torque constant of 0.05 (Nm/A) and a mechanical inertia of $47 \times 10^{-7}$ (kgm$^2$).

In FIGS. 3 and 4, broken lines are for the conventional art and solid lines are for the present embodiment in which the parameter $\alpha$ is adjusted such that the same band width as that when the gain is appropriately set in the conventional art configuration is brought. As shown in FIG. 3, a rise time in the conventional art is slightly superior, but the damping in the response by the present embodiment is superior and the undershoot is reduced and the convergence to the target value is more accelerated. Since the band width is set substantially equal, the target value response characteristics as a whole are of substantially equal positioning waveforms. As seen from FIG. 3, the disturbance suppression ability is far superior in the present embodiment.

In this manner, the adjustment of the servo system using the integration-proportional differentiation type compensation system is facilitated and the construction of the control system is simplified, and speed of the servo system response and the strength against the disturbance are improved.

Second Embodiment

Figure 5:
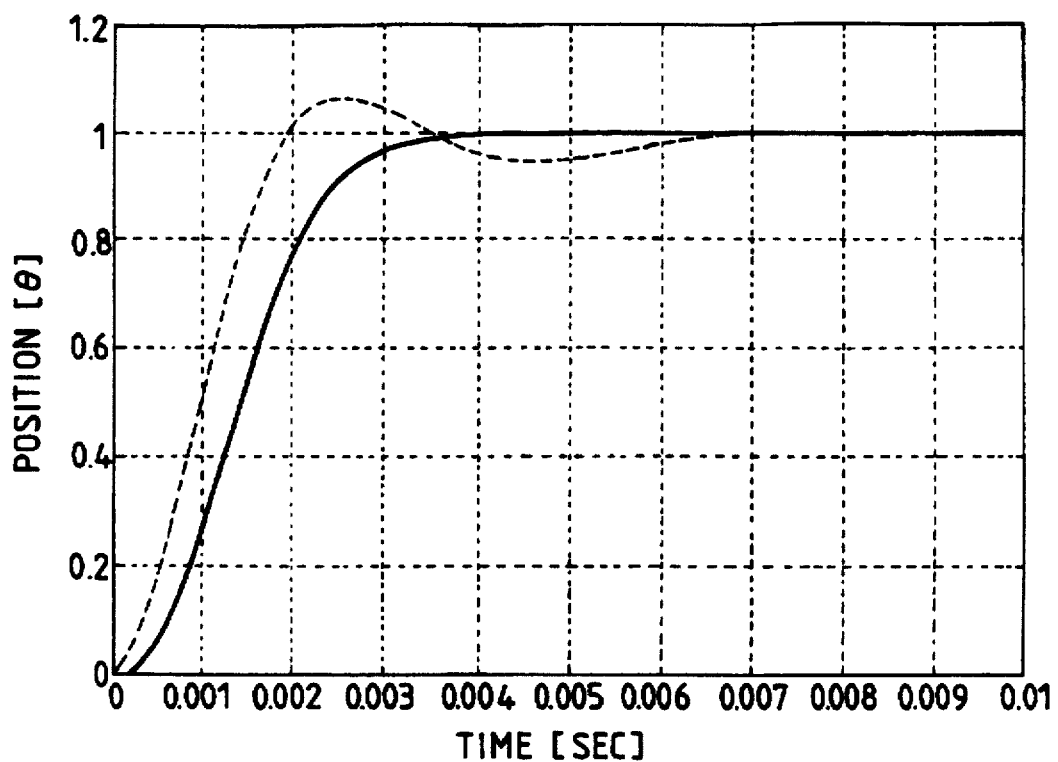
FIG. 5 shows waveforms of positioning response in a second embodiment of the present invention.

In the above embodiment, the integration gain H is uniquely determined by using the parameter $\alpha$ although it may be positively adjusted to attain a desired characteristic. For example, when the integration gain H is adjusted slightly smaller than the value determined by the formula (3), the positioning response shown in FIG. 5 is attained. In FIG. 5, a broken line is for the prior art and a solid line is for the second embodiment.

By setting the integration gain H slightly smaller, the overshoot is eliminated as shown in FIG. 5 and quick convergence characteristic is attained at a sacrifice of the rising characteristic to some extent. This is a characteristic of the present embodiment which is difficult to excite a resonance point present in the mechanical system. This characteristic is very useful in an application where the overshoot is not permitted as in a grinding machine tool. However, it is to be noticed that the adjustment of the integration gain H is the trade-off of the rising characteristic. Specifically, in the formula (1), the coefficient "a" may be adjusted in a range of 2 to 3 to attain a desired characteristic, as follows:

$F_2/F_2=a*H/F_2$ (1), where $2 \leq a \leq 3$.

Third Embodiment

Figure 6:
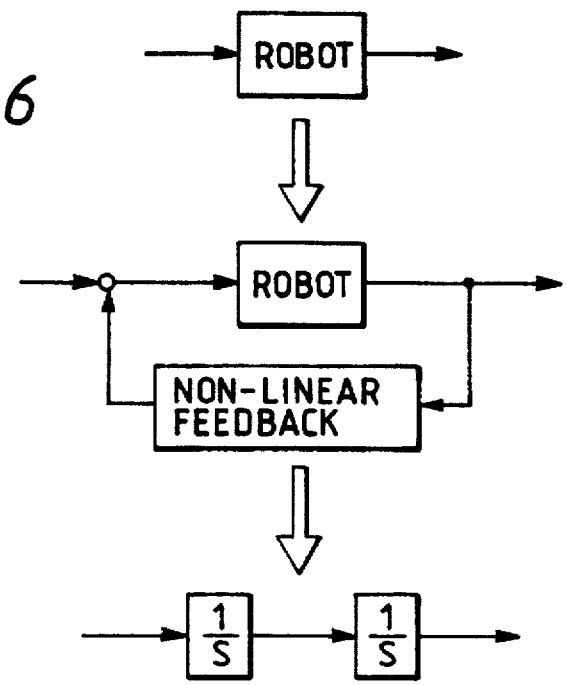
FIG. 6 shows a block diagram of a configuration of a third embodiment of the present invention.

The present invention intends to the servo adjusting method for the double integration type object to be controlled but it is not necessarily limited thereto. For example, the present invention is applicable without problem to an object to be controlled which includes a first order lag element and the like in a high frequency band but may be regarded as the double integration type in a low frequency control band. For an object having a complex dynamic characteristic such as a robot manipulator, a kind of non-linear feedback may be applied as shown in FIG. 6 to convert the characteristic of the object to be controlled to the double integration type. Accordingly, by applying the feedback as shown in FIG. 6, the adjusting method of the present invention can be applied as it is.

In the third embodiment of the present invention in which the non-linear feedback is applied to the object to be controlled such as the robot, the same effect as that of the above embodiment is attained, the adjustment of the servo system is facilitated, the construction of the system is simplified and excellent servo system control is attained.

Fourth Embodiment

As shown in the first embodiment, the adjustment rule defined by the formulas (3) and (4) is an optimum solution to minimize the performance index of the formula (5) but, in actual, the gain K of the object to be controlled may not be precisely determined. Such a value may also vary under various load conditions.

Figure 7:
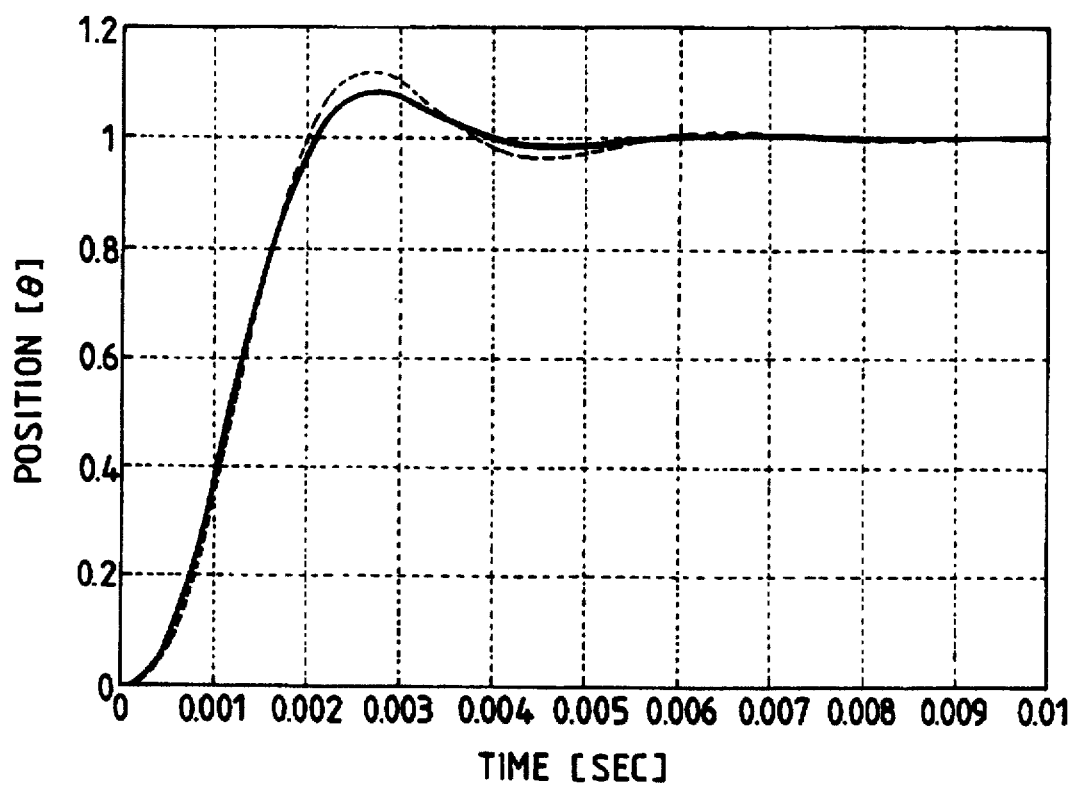
FIG. 7 shows waveforms of positioning response in a fourth embodiment of the present invention.

FIG. 7 shows waveforms of positioning response when the gain is increased by 25% from a nominal value in the same object to be controlled as that of the first embodiment. In FIG. 7, a solid line is for the nominal value, and a broken line is for the perturbation from the nominal value. The latter attains a substantially desired characteristic although it exhibits a slight reduction of the convergence characteristic. Accordingly, in accordance with the present invention, a robust control system against the variation of the characteristic of the object to be controlled is attained. Specifically, a substantially desired characteristic is attained when the coefficient "b" of the right side of the formula (2) is 1.5 or above, $F_1=b*(F_2/F_1)/K$ (2), where $1.5 \leq b$ and K is a gain of the object to be controlled, that is, when the 30% increase of the gain of the object to be controlled is a maximum value.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes come within the meaning and range of equivalency of the claims are therefore intended to be embraced therein.

What is claimed is:

1. A servo system coefficient adjusting method for an integration-proportional differentiation type compensation system for generating a control input for an object to be controlled by summing an integration of a control error, a controlled amount output from the controlled object and a differentiation of the controlled amount, multiplied by gain coefficients, respectively, wherein a transfer function of the object to be controlled is approximated by a double-integral-type, comprising the steps of:

selecting one of a feedback gain coefficient $F_1$ of differentiation of the controlled amount, a feedback gain coefficient $F_2$ of the controlled amount and a gain coefficient H of integration of the control error;

setting a gain value of the selected feedback gain coefficient;

determining values of the remaining feedback gain coefficients based on the set gain value of the selected feedback gain coefficient and the formulas:

$F_2/F_1=a*H/F_2$ $F_1=b*(F_2/F_1)/K$ where $2 \leq a \leq 3$, $1.5 \leq b$, and K is a gain of the object to be controlled; and setting the determined values of the remaining feedback gain coefficients.

2. A servo system coefficient adjusting method according to claim 1, further comprising the steps of:

operating the servo system by using the set gain values for the servo system;

detecting an an output of the object to be controlled; and changing the gain value of the selected feedback gain coefficient on the basis of the output of the detection step.

3. A servo control system of an integration-proportional differentiation type compensation system for generating a control input for an object to be controlled by summing an integration of a control error, a controlled amount output from the controlled object and differentiation of the controlled amount, multiplied by coefficients, respectively, wherein a transfer function of the object to be controlled is approximated by a double-integral-type, comprising:

selecting means for selecting one of a feedback gain coefficient $F_1$ of differentiation of the controlled amount, a feedback gain coefficient $F_2$ of the controlled amount and a gain coefficient H of integration of the control error;

setting means for setting a gain value of the selected feedback gain coefficient;

determining means for determining values of the remaining feedback gain coefficients based on the set gain value of the selected feedback gain coefficient and the formulas:

$F_2/F_1=a*H/F_2$ $F_1=b*(F_2/F_1)/K$ where $2 \leq a \leq 3$, $1.5 \leq b$, and K is a gain of the object to be controlled; and setting means for setting the determined values of the remaining feedback gain coefficients.

4. A servo control system according to claim 3, further comprising:

detection means for detecting an output of the object to be controlled.

* * * * *

UNITED STATES PATENT AND TRADEMARK OFFICE
CERTIFICATE OF CORRECTION

PATENT NO. : 5,691,614

DATED : November 25, 1997

INVENTOR(S): HIROAKI TAKELSHI

It is certified that error appears in the above-identified patent and that said Letters Patent is hereby corrected as shown below:

COLUMN 1

Line 39, "operate," should read --operated,--.

COLUMN 2

Line 36, "gains" should read --gain--;
Line 56, "a" should be deleted.

COLUMN 3

Line 45, " $J = \int_0^{-\infty} \left[\theta^2 + \frac{K^2}{\alpha^6}\left(\frac{du}{dt}\right)^2\right]dt \quad \ldots\ldots(5)$ " should read -- $J = \int_0^{\infty} \left[\theta^2 + \frac{K^2}{\alpha^6}\left(\frac{du}{dt}\right)^2\right]dt \quad \ldots\ldots(5)$ --

COLUMN 4

Line 30, "second)" should read --seconds)--.

UNITED STATES PATENT AND TRADEMARK OFFICE
CERTIFICATE OF CORRECTION

PATENT NO. : 5,691,614

DATED : November 25, 1997

INVENTOR(S): HIROAKI TAKELSHI

It is certified that error appears in the above-identified patent and that said Letters Patent is hereby corrected as shown below:

<u>COLUMN 5</u>

Line 9, intends to the" should read --provides a--.

Signed and Sealed this

Second Day of June, 1998

*Attest:*

BRUCE LEHMAN

*Attesting Officer*     *Commissioner of Patents and Trademarks*